US008718565B1

(12) United States Patent
Rai et al.

(10) Patent No.: US 8,718,565 B1
(45) Date of Patent: May 6, 2014

(54) FRAME OFFSET ADJUSTMENT BASED ON EFFICIENCY OF INTERFERENCE CANCELLATION

(75) Inventors: Deveshkumar Narendrapratap Rai, Overland Park, KS (US); Sachin R. Vargantwar, Macon, GA (US); Maulik K. Shah, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 121 days.

(21) Appl. No.: 13/529,743

(22) Filed: Jun. 21, 2012

(51) Int. Cl.
*H04B 1/00* (2006.01)
*H04B 15/00* (2006.01)

(52) U.S. Cl.
USPC ....... 455/63.1; 455/67.13; 455/450; 455/451; 455/452.1; 455/452.2; 455/453; 370/320; 370/328; 370/329; 370/335; 370/341; 370/342; 375/346; 375/347

(58) Field of Classification Search
USPC .............. 455/63.1, 67.13, 450–453; 370/320, 370/328, 329, 335, 341, 342; 375/346, 347
See application file for complete search history.

(56) References Cited

U.S. PATENT DOCUMENTS

| 6,072,845 | A  | * | 6/2000  | Bond et al. ..................... 375/350 |
| 6,594,495 | B2 | * | 7/2003  | Salonaho et al. ............. 455/453 |
| 7,385,944 | B2 |   | 6/2008  | Kong et al. |
| 7,443,829 | B2 |   | 10/2008 | Rizvi et al. |
| 7,463,672 | B2 |   | 12/2008 | Monsen |
| 8,374,299 | B2 | * | 2/2013  | Olson et al. ................... 375/346 |
| 8,432,874 | B2 | * | 4/2013  | Bjorkegren et al. .......... 370/335 |
| 2005/0220051 | A1 |  | 10/2005 | Lavean |
| 2009/0088080 | A1 | * | 4/2009  | Zhang et al. ................. 455/63.1 |
| 2009/0232073 | A1 | * | 9/2009  | Yan et al. ...................... 370/329 |

OTHER PUBLICATIONS

Peter Black, Yu-Cheun Jou, Rashid Attar, jun Ma, Xin Zhang, Interference Cancellation Techniques for CDMA2000 1x Reverse Link, Nov. 30-Dec. 4, 2009, Proceeding of Global Communications Conference, GLOBECOM 2009.*

* cited by examiner

*Primary Examiner* — Olumide T Ajibade Akonai

(57) ABSTRACT

A wireless access node comprises a wireless communication transceiver and a processing system. The wireless communication transceiver is configured to exchange wireless communications with a plurality of wireless communication devices over a plurality of wireless communication channels. The processing system is configured to monitor a loading level on the wireless communication channels to determine when the loading level exceeds a loading threshold, and when the loading level exceeds the loading threshold, calculate an efficiency of an interference cancellation process, compare the efficiency of the interference cancellation process to an efficiency threshold, and if the efficiency of the interference cancellation process falls below the efficiency threshold, modify a frame offset in use by the wireless communication devices on at least one reverse link communication channel.

20 Claims, 5 Drawing Sheets

FRAME OFFSET ADJUSTMENT BASED ON EFFICIENCY OF INTERFERENCE CANCELLATION

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize forward link communication channels to receive voice and/or data transmitted from the wireless access node, and reverse link communication channels to transmit information up to the node. Most wireless access nodes are capable of serving a large number of wireless communication devices at the same time. However, as the number of wireless devices served by a particular wireless access node increases, so does the amount of interference present on the wireless communication channels utilized by the devices to send and receive information. For example, wireless communication service providers attempt to use the allocated spectrum as efficiently as possible and to the highest possible capacity by allowing several wireless devices to operate in the same frequency. However, this practice creates increased interference to users operating wireless devices in close proximity, which can lead to dropped frames, data loss, reduction in voice quality, and possible call drop.

To address this interference problem, modern wireless communication protocols often employ various interference cancellation mechanisms. Typically, such interference cancellation techniques use known components of a wireless signal to eliminate interference for the un-decoded signal. Some examples of interference cancellation techniques employed by wireless communication systems include pilot interference cancellation (PIC), forward link interference cancellation (FLIC), and quasi-linear interference cancellation (QLIC), which is a mechanism used for both PIC and FLIC. Along with the forward link, several techniques exist for interference cancellation on reverse link communication channels.

OVERVIEW

A method of operating a wireless access node is disclosed. The method comprises exchanging wireless communications with a plurality of wireless communication devices over a plurality of wireless communication channels. The method further comprises monitoring a loading level on the wireless communication channels to determine when the loading level exceeds a loading threshold. The method further comprises, when the loading level exceeds the loading threshold, calculating an efficiency of an interference cancellation process. The method further comprises comparing the efficiency of the interference cancellation process to an efficiency threshold. The method further comprises, if the efficiency of the interference cancellation process falls below the efficiency threshold, modifying a frame offset in use by the wireless communication devices on at least one reverse link communication channel.

A wireless access node comprises a wireless communication transceiver and a processing system. The wireless communication transceiver is configured to exchange wireless communications with a plurality of wireless communication devices over a plurality of wireless communication channels. The processing system is configured to monitor a loading level on the wireless communication channels to determine when the loading level exceeds a loading threshold, and when the loading level exceeds the loading threshold, calculate an efficiency of an interference cancellation process, compare the efficiency of the interference cancellation process to an efficiency threshold, and if the efficiency of the interference cancellation process falls below the efficiency threshold, modify a frame offset in use by the wireless communication devices on at least one reverse link communication channel.

A computer apparatus comprises software instructions and at least one non-transitory computer-readable storage medium storing the software instructions. The software instructions are configured, when executed by a wireless access node, to direct the wireless access node to exchange wireless communications with a plurality of wireless communication devices over a plurality of wireless communication channels, monitor a loading level on the wireless communication channels to determine when the loading level exceeds a loading threshold, and calculate an efficiency of an interference cancellation process when the loading level exceeds the loading threshold. The software instructions are further configured to direct the wireless access node to compare the efficiency of the interference cancellation process to an efficiency threshold, and if the efficiency of the interference cancellation process falls below the efficiency threshold, modify a frame offset in use by the wireless communication devices on at least one reverse link communication channel.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
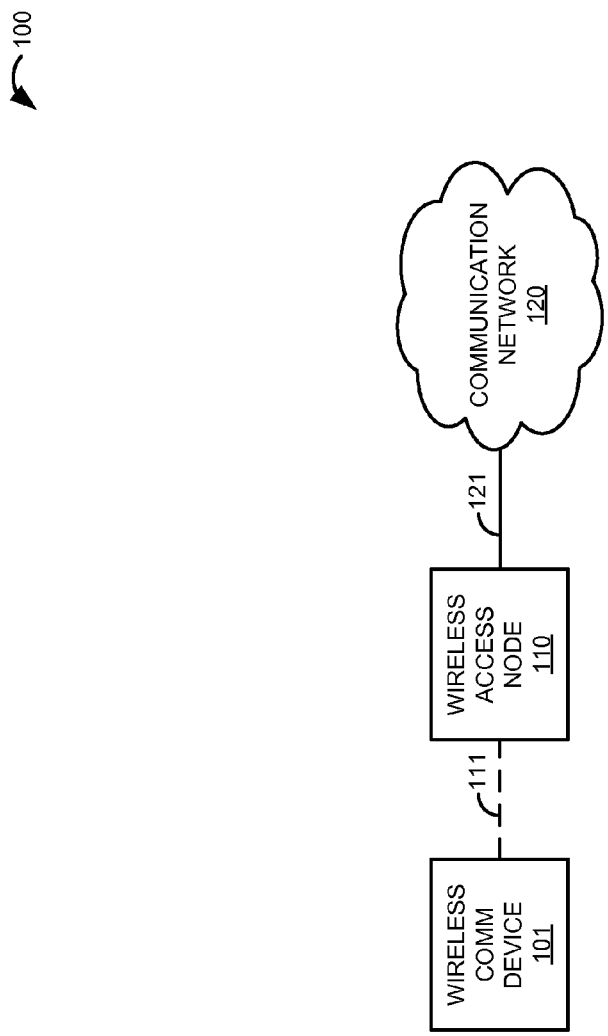
FIG. 1 is a block diagram that illustrates a communication system.

FIG. 1 is a block diagram that illustrates communication system 100. Communication system 100 includes wireless communication device 101, wireless access node 110, and communication network 120. Wireless communication device 101 and wireless access node 110 are in communication over wireless communication link 111. Wireless access node 110 and communication network 120 are in communication over communication link 121. Note that although the following description refers to a plurality of wireless communication devices, only one wireless communication device 101 is shown on FIG. 1 for clarity, but should be considered representative of the plurality.

Figure 2:
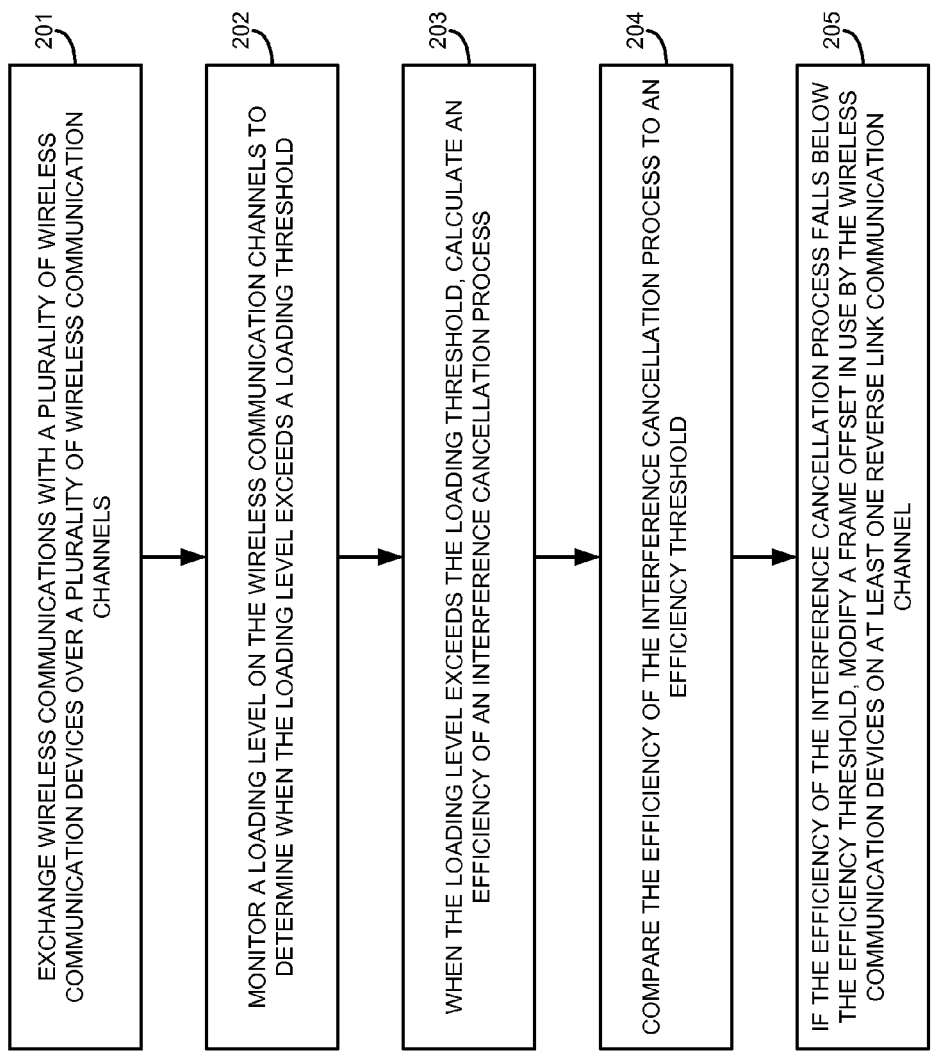
FIG. 2 is a flow diagram that illustrates an operation of the communication system.

FIG. 2 is a flow diagram that illustrates an operation of communication system 100. The steps of the operation are indicated below parenthetically. Initially, wireless access node 110 exchanges wireless communications with a plurality of wireless communication devices 101 over a plurality of wireless communication channels (201). Typically, the wireless communications exchanged between wireless access node 110 and wireless communication device 101 comprise voice and/or data communications. For example, wireless communication device 101 could transmit and receive voice communications with wireless access node 110 during a voice call. In other examples, device 101 and node 110 could exchange wireless communications with regard to short message service (SMS) text messages, email messages, instant messaging, gaming applications, file and document transfers, media such as video, audio, and photos, and any other data. The wireless communication channels over which the wireless communications are exchanged comprise both forward link and reverse link communication channels. A forward link communication channel describes a wireless channel over which voice, data and other communications are transmitted from wireless access node 110 for delivery to wireless communication device 101, whereas a reverse link communication channel describes a wireless channel over which the wireless communications are transmitted from wireless communication device 101 for delivery to wireless access node 110.

Wireless access node 110 monitors a loading level on the wireless communication channels to determine when the loading level exceeds a loading threshold (202). Typically, to monitor the loading level on the wireless communication channels, wireless access node 110 could determine an amount of utilization of the wireless communication channels. The loading level on the wireless communication channels could comprise any value in any format, but some examples include a number of devices such as wireless communication device 101 that are presently using the wireless communication channels, an amount of bandwidth being consumed or utilized, an amount of users, connections, or communication sessions, a percentage of communication loading on wireless access node 110, bandwidth utilization, or any other metric indicating utilization of wireless access node 110.

The loading threshold typically comprises a threshold for a maximum communication loading on the communication channels serviced by wireless access node 110. The loading threshold could comprise any value in any format, but some examples include a threshold amount of users, connections, or communication sessions, a percentage of communication loading or bandwidth utilization, or any other threshold regarding the utilization of wireless access node 110. In some examples, the loading threshold could also comprise an optimal loading level or a maximum loading level for wireless access node 110. Note that the loading threshold for a given wireless access node 110 could be different from other wireless access nodes depending on their respective communication loading capacities. Typically, when a loading threshold for a particular wireless access node 110 is exceeded, the wireless access node 110 associated with that loading threshold is considered overloaded.

When the loading level exceeds the loading threshold, wireless access node 110 calculates an efficiency of an interference cancellation process (203). In some examples, wireless access node 110 could employ an interference cancellation process to eliminate interference for un-decoded portions of the wireless communication channels using the known components of a wireless signal. Typically, the efficiency of the interference cancellation process could depend on an alignment of the wireless communication channels. For example, wireless access node 110 could calculate the efficiency of the interference cancellation process by determining how the reverse link communication channels align in time relative to each other. In some examples, wireless access node 110 could also calculate the efficiency of the interference cancellation process by calculating a ratio of a number of frames decoded and used for interference cancellation to a total number of frames being processed. Additional and/or alternative techniques for calculating the efficiency of the interference cancellation process are also possible and are within the scope of this disclosure.

Wireless access node 110 compares the efficiency of the interference cancellation process to an efficiency threshold (204). Typically, wireless access node 110 calculates the efficiency of the interference cancellation process in a particular numerical format, such as a ratio, percentage, or the like, and this value could be continually compared to an efficiency threshold in comparable units. In some examples, the efficiency threshold could be predetermined, or could be determined dynamically, such as based on a number of users, connections, or devices utilizing wireless access node 110. The efficiency threshold could also be different for various wireless access nodes, and may depend on the relative capacities of the nodes or other distinguishing features in some examples.

If the efficiency of the interference cancellation process falls below the efficiency threshold, wireless access node 110 modifies a frame offset in use by the wireless communication devices 101 on at least one reverse link communication channel (205). Typically, the frame offset being used by wireless communication device 101 on the at least one reverse link communication channel relates to a timing alignment of the frames on the at least one reverse link communication channel utilized by wireless communication device 101 relative to frames of other reverse link communication channels that are also in use by other wireless communication devices. In other words, the frame offset that is modified by wireless access node 110 could be different for each wireless communication device 101 that is presently served by the node 110. In some examples, wireless access node 110 modifies the frame offset in use by the wireless communication devices 101 on the at least one reverse link communication channel by modifying a timing alignment of the at least one reverse link communication channel. For example, based on the efficiency of the interference cancellation process falling below the efficiency threshold, wireless access node 110 could modify how frames of the reverse link communication channels align in time relative to each other in order to improve the efficiency of the interference cancellation process.

In some examples, wireless access node 110 could additionally or alternatively compare the efficiency of the interference cancellation process to a second threshold that is lower than the efficiency threshold. In this case, if the efficiency of the interference cancellation process falls below the second threshold, wireless access node 110 could signal to wireless communication device 101 to not transmit a voice frame. In some examples, when signaling to wireless communication device 101 to not transmit the voice frame, wireless access node 110 could signal to wireless communication device 101 to not transmit the voice frame except for a pilot frame.

Advantageously, wireless access node 110 modifies an alignment of frames of reverse link wireless communication channels based on an efficiency of a noise cancellation process employed by node 110. By modifying the frame offset of the reverse link channels relative to each other, capacity may be increased and performance gains achieved from optimizing the frame timing alignment for these noise cancellation techniques. In this manner, the efficiency of the interference cancellation process employed by wireless access node 110 can be increased whenever it falls below a certain efficiency threshold by way of frame offset adjustments.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
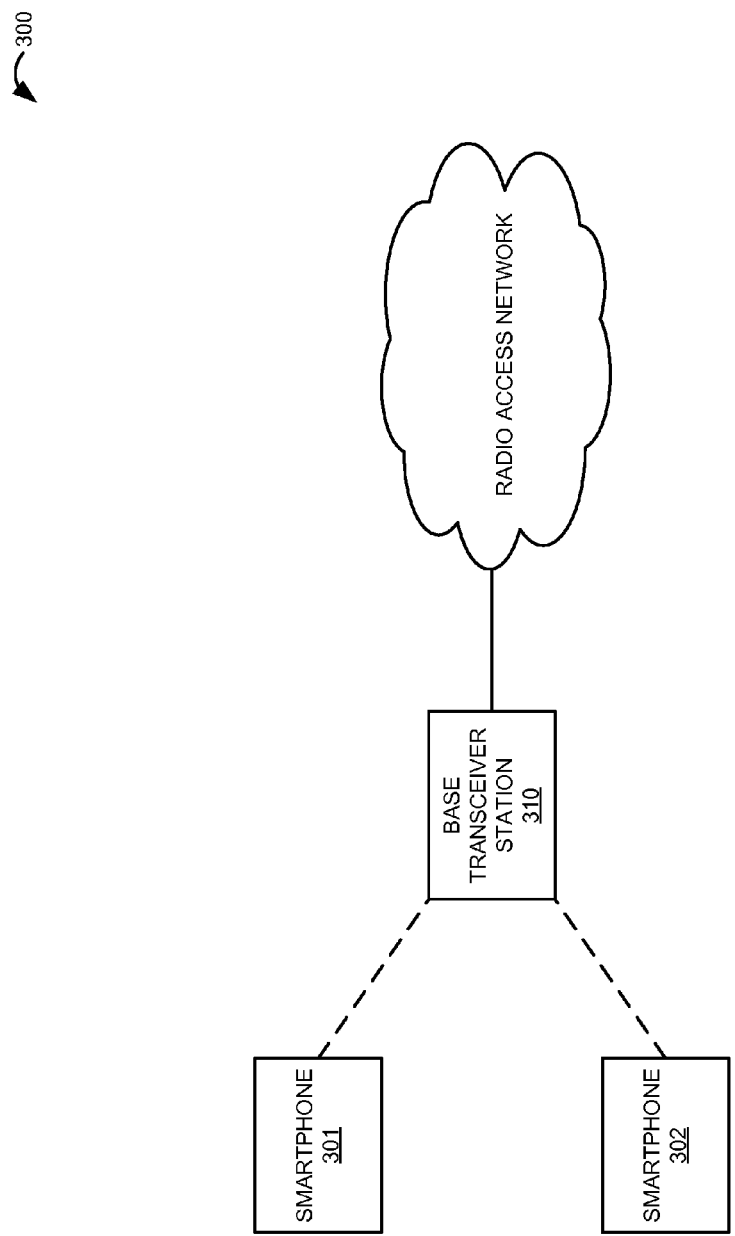
FIG. 3 is a block diagram that illustrates a communication system in an exemplary embodiment.

FIG. 3 is a block diagram that illustrates communication system 300 in an exemplary embodiment. Communication system 300 includes smartphones 301-302 and base transceiver station (BTS) 310 which connects the smartphones to the access network. In the example of communication system 300, BTS 310 provides an example of wireless access node 110, although node 110 could use alternative configurations in other examples. In this example, smartphones 301-302 and BTS 310 communicate in a CDMA 1xRTT wireless protocol.

Figure 4:
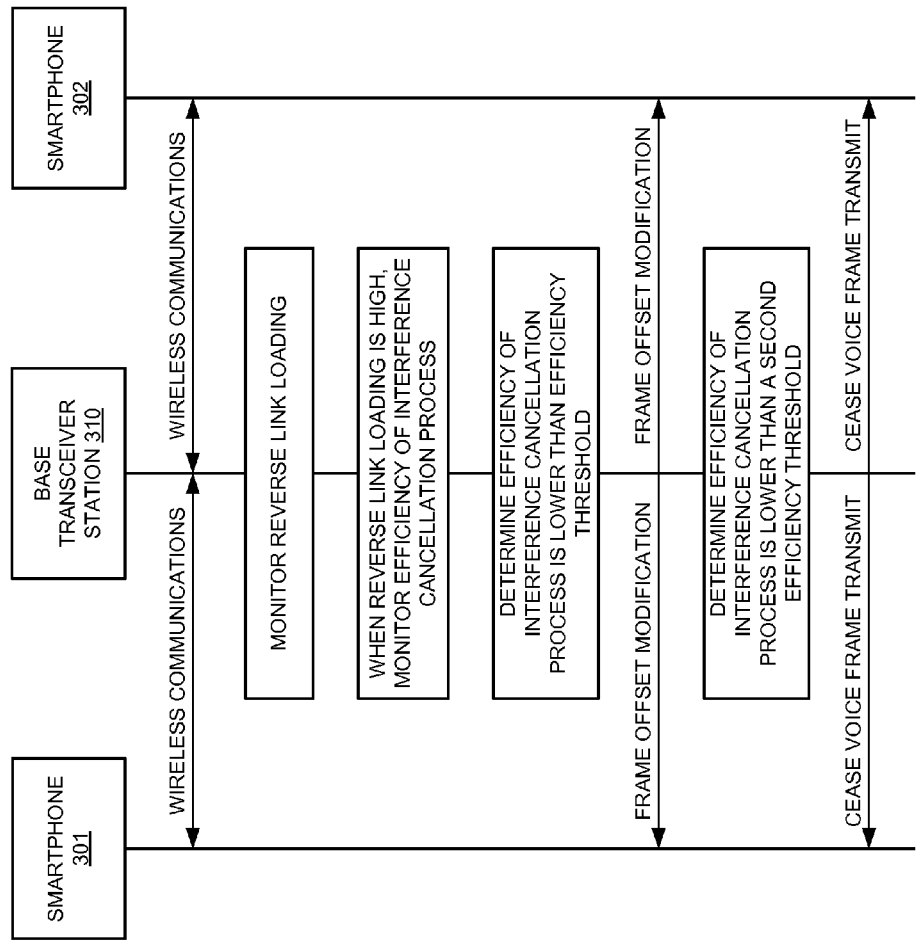
FIG. 4 is a sequence diagram that illustrates an operation of a communication system in an exemplary embodiment.

FIG. 4 is a sequence diagram that illustrates an operation of communication system 300 in an exemplary embodiment. Smartphones 301 and 302 are operated by their respective users to transmit and receive wireless communications over the radio access network (RAN) via BTS 310. In this example, the smartphones 301 and 302 are both engaged in voice calls with other telephones (not shown). BTS 310 utilizes CDMA 1xRTT advanced technology, which introduces interference cancellation mechanisms. The interference cancellation processes employed by BTS 310 utilize the "known" component of a CDMA signal to eliminate interference for the "un-decoded" signal/channel. Typically, the efficiency of this noise cancellation process depends on how the reverse link channels align in time relative to each other.

In order to improve the efficiency of the interference cancellation process, the timing of the reverse link channels can be modified based on the efficiency of the process. Prior to performing any modifications, BTS 310 monitors the communication loading on the reverse link communication channels utilized by smartphones 301 and 302 to transmit voice frames to BTS 310. For example, if both smartphones 301 and 302 are actively engaged in voice calls and are transmitting large amounts of voice frames on the uplink to BTS 310, the communication loading on the reverse link communication channels could be compared to a loading threshold to determine if the loading level is high.

If reverse link loading is high (i.e., exceeds a certain threshold), BTS 310 monitors the efficiency of the interference cancellation process on the reverse link communication channels. The efficiency of the interference cancellation process can be calculated by a ratio of the number of frames decoded and used for interference cancellation divided by a total number of frames being processed. If BTS 310 determines that the efficiency of the interference cancellation process is lower than a certain efficiency threshold, BTS 310 can modify the frame offset being used by smartphones 301 and 302 on the reverse link channels.

In the example of FIG. 4, and in response to detecting high communication loading on the reverse link channels, BTS 310 determines that the efficiency of interference cancellation process has fallen below an efficiency threshold. Thus, BTS 310 transmits frame offset modification instructions to the smartphones 301 and 302. In order to avoid interruptions in service, BTS 310 transmits the frame offset modifications in between the current transmission. Responsive to the frame offset modification instructions, smartphones 301 and 302 adjust the timing and alignment of the frames being used to transmit voice communications to BTS 310 on the reverse link communication channels. In addition to modifying the frame offset of smartphones 301 and 302 which are presently engaged in active voice calls, new calls being set up by BTS 310 for other wireless devices (not shown) are assigned a frame offset unique to smartphones 301 and 302 to avoid introducing additional interference. Failing to assign unique frame offsets for newly setup calls, BTS 310 at least assigns frame offsets for the new calls that are used by the least amount of the presently active mobile terminals on BTS 310.

Even after modifying the frame offsets of smartphones 301 and 302, BTS 310 continues to monitor the efficiency of the interference cancellation process on the reverse link communication channels. If the efficiency of the noise cancellation mechanisms falls below a second efficiency threshold that is lower than the first efficiency threshold, BTS 310 should signal smartphones 301 and 302 to not transmit voice frames (except the pilot signal) in case the user is silent (i.e., no voice activity and only transmitting blank frames). By instructing the smartphones 301 and 302 to not transmit voice frames when they contain no voice communications, BTS 310 effectively reduces the interference present on the reverse links, increases uplink bandwidth, and improves the efficiency of the interference cancellation process in use on the reverse link communication channels.

According to the above techniques, BTS 310 can intelligently utilize the frame offset parameter to increase the efficiency of the interference cancellation process. When the interference cancellation mechanisms are operating with better efficiency, the communication channels utilized by smartphones 301 and 302 will exhibit performance gains and increased capacity. In addition, interference will be reduced and smartphones 301 and 302 will require lower transmission power to achieve a line of sight with BTS 310, which in turn increases the battery power life of smartphones 301 and 302.

Figure 5:
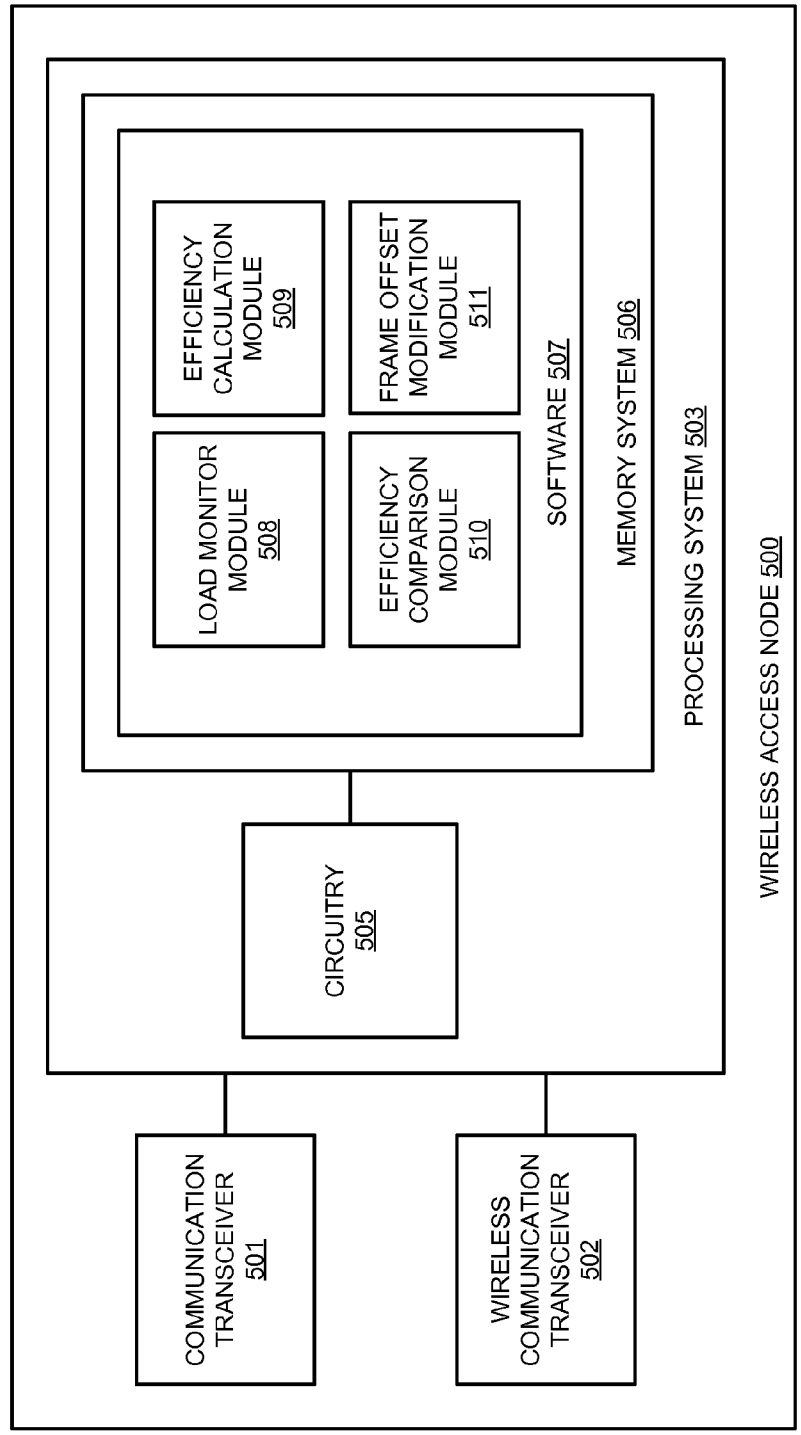
FIG. 5 is a block diagram that illustrates a wireless access node.

FIG. 5 is a block diagram that illustrates wireless access node 500. Wireless access node 500 provides an example of wireless access node 110, although node 110 may have alternative configurations. Wireless access node 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 is configured to exchange wireless communications with a plurality of wireless communication devices over a plurality of wireless communication channels.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 50-511, although software 507 could have alternative configurations in other examples.

When executed by circuitry 505, operating software 507 directs processing system 503 to operate as described herein. In particular, operating software 507 may direct processing system 503 to direct wireless communication transceiver 502 to exchange wireless communications with a plurality of wireless communication devices over a plurality of wireless communication channels. Additionally, operating software 507 directs processing system 503 to monitor a loading level on the wireless communication channels to determine when the loading level exceeds a loading threshold. When the loading level exceeds the loading threshold, operating software 507 directs processing system 503 to calculate an efficiency of an interference cancellation process. Further, operating software 507 directs processing system 503 to compare the efficiency of the interference cancellation process to an efficiency threshold. If the efficiency of the interference cancellation process falls below the efficiency threshold, operating software 507 directs processing system 503 to modify a frame offset in use by the wireless communication devices on at least one reverse link communication channel.

In this example, operating software 507 comprises a load monitor software module 508 that monitors a loading level on a plurality of wireless communication channels to determine when the loading level exceeds a loading threshold. In addition, operating software 507 comprises an efficiency calculation software module 509 that, when the loading level exceeds the loading threshold, calculates an efficiency of an interference cancellation process. Further, operating software 507 comprises an efficiency comparison software module 510 that compares the efficiency of the interference cancellation process to an efficiency threshold. Finally, operating software 507 comprises a frame offset modification software module 511 that, if the efficiency of the interference cancellation process falls below the efficiency threshold, modifies a frame offset in use by the wireless communication devices on at least one reverse link communication channel.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node, the method comprising:
    exchanging wireless communications with a plurality of wireless communication devices over a plurality of wireless communication channels;
    monitoring a loading level on the wireless communication channels to determine when the loading level exceeds a loading threshold;
    when the loading level exceeds the loading threshold, calculating an efficiency of an interference cancellation process;
    comparing the efficiency of the interference cancellation process to an efficiency threshold; and
    if the efficiency of the interference cancellation process falls below the efficiency threshold, modifying a frame offset in use by the wireless communication devices on at least one reverse link communication channel.

2. The method of claim 1 further comprising:
    comparing the efficiency of the interference cancellation process to a second threshold that is lower than the efficiency threshold; and
    if the efficiency of the interference cancellation process falls below the second threshold, signaling to the wireless communication devices to not transmit a voice frame.

3. The method of claim 2 wherein signaling to the wireless communication devices to not transmit the voice frame comprises signaling to the wireless communication devices to not transmit the voice frame except for a pilot frame.

4. The method of claim 1 wherein calculating the efficiency of the interference cancellation process comprises calculating a ratio of a number of frames decoded and used for interference cancellation to a total number of frames being processed.

5. The method of claim 1 wherein monitoring the loading level on the wireless communication channels to determine when the loading level exceeds the loading threshold comprises monitoring the loading level on the at least one reverse link communication channel to determine when the loading level exceeds the loading threshold.

6. The method of claim 1 wherein modifying the frame offset in use by the wireless communication devices on the at least one reverse link communication channel comprises modifying a timing alignment of the at least one reverse link communication channel.

7. The method of claim 1 wherein exchanging the wireless communications with the plurality of wireless communication devices over the plurality of wireless communication channels comprises exchanging the wireless communications with the wireless communication devices in a code division multiple access wireless protocol.

8. A wireless access node comprising:
    a wireless communication transceiver configured to exchange wireless communications with a plurality of wireless communication devices over a plurality of wireless communication channels; and
    a processing system configured to monitor a loading level on the wireless communication channels to determine when the loading level exceeds a loading threshold, and when the loading level exceeds the loading threshold, calculate an efficiency of an interference cancellation process, compare the efficiency of the interference cancellation process to an efficiency threshold, and if the efficiency of the interference cancellation process falls below the efficiency threshold, modify a frame offset in use by the wireless communication devices on at least one reverse link communication channel.

9. The wireless access node of claim 8 further comprising:
    the processing system further configured to compare the efficiency of the interference cancellation process to a second threshold that is lower than the efficiency threshold, and if the efficiency of the interference cancellation process falls below the second threshold, signal to the wireless communication devices to not transmit a voice frame.

10. The wireless access node of claim 9 wherein the processing system configured to signal to the wireless communication devices to not transmit the voice frame comprises the processing system configured to signal to the wireless communication devices to not transmit the voice frame except for a pilot frame.

11. The wireless access node of claim 8 wherein the processing system configured to calculate the efficiency of the interference cancellation process comprises the processing system configured to calculate a ratio of a number of frames decoded and used for interference cancellation to a total number of frames being processed.

12. The wireless access node of claim 8 wherein the processing system configured to monitor the loading level on the wireless communication channels to determine when the loading level exceeds the loading threshold comprises the processing system configured to monitor the loading level on the at least one reverse link communication channel to determine when the loading level exceeds the loading threshold.

13. The wireless access node of claim 8 wherein the processing system configured to modify the frame offset in use by the wireless communication devices on the at least one reverse link communication channel comprises the processing system configured to modify a timing alignment of the at least one reverse link communication channel.

14. The wireless access node of claim 8 wherein the wireless communication transceiver configured to exchange the wireless communications with the plurality of wireless communication devices over the plurality of wireless communication channels comprises the wireless communication transceiver configured to exchange the wireless communications with the wireless communication devices in a code division multiple access wireless protocol.

15. A computer apparatus comprising:
software instructions configured, when executed by a wireless access node, to direct the wireless access node to exchange wireless communications with a plurality of wireless communication devices over a plurality of wireless communication channels, monitor a loading level on the wireless communication channels to determine when the loading level exceeds a loading threshold, calculate an efficiency of an interference cancellation process when the loading level exceeds the loading threshold, compare the efficiency of the interference cancellation process to an efficiency threshold, and if the efficiency of the interference cancellation process falls below the efficiency threshold, modify a frame offset in use by the wireless communication devices on at least one reverse link communication channel; and
at least one non-transitory computer-readable storage medium storing the software instructions.

16. The computer apparatus of claim 15 wherein the software instructions are configured to direct the wireless access node to compare the efficiency of the interference cancellation process to a second threshold that is lower than the efficiency threshold, and if the efficiency of the interference cancellation process falls below the second threshold, signal to the wireless communication devices to not transmit a voice frame.

17. The computer apparatus of claim 16 wherein the software instructions configured to direct the wireless access node to signal the wireless communication devices to not transmit the voice frame comprises the software instructions configured to direct the wireless access node to signal to the wireless communication devices to not transmit the voice frame except for a pilot frame.

18. The computer apparatus of claim 15 wherein the software instructions configured to direct the wireless access node to calculate the efficiency of the interference cancellation process comprises the software instructions configured to direct the wireless access node to calculate a ratio of a number of frames decoded and used for interference cancellation to a total number of frames being processed.

19. The computer apparatus of claim 15 wherein the software instructions configured to direct the wireless access node to monitor the loading level on the wireless communication channels to determine when the loading level exceeds the loading threshold comprises the software instructions configured to direct the wireless access node to monitor the loading level on the at least one reverse link communication channel to determine when the loading level exceeds the loading threshold.

20. The computer apparatus of claim 15 wherein the software instructions configured to direct the wireless access node to modify the frame offset in use by the wireless communication devices on the at least one reverse link communication channel comprises the software instructions configured to direct the wireless access node to modify a timing alignment of the at least one reverse link communication channel.

* * * * *